United States Patent [19]

Heithoff

[11] Patent Number: 5,030,594

[45] Date of Patent: * Jul. 9, 1991

[54] HIGHLY TRANSPARENT, EDGE COLORED GLASS

[75] Inventor: Robert B. Heithoff, LaVale, Md.

[73] Assignee: PPG Industries, Inc., Pittsburgh, Pa.

[ * ] Notice: The portion of the term of this patent subsequent to Jul. 9, 2008 has been disclaimed.

[21] Appl. No.: 545,722

[22] Filed: Jun. 29, 1990

[51] Int. Cl.$^5$ .............................................. C03C 3/078
[52] U.S. Cl. ...................................... 501/72; 501/70; 501/71
[58] Field of Search ............................. 501/70, 71, 72

[56] References Cited

U.S. PATENT DOCUMENTS

| | | | |
|---|---|---|---|
| 3,330,638 | 7/1967 | Brown | 501/71 X |
| 3,723,142 | 3/1973 | Kato et al. | 501/71 |
| 4,104,076 | 8/1978 | Pons | 501/71 X |
| 4,339,541 | 7/1982 | Dela Ruye | 501/71 |
| 4,792,536 | 12/1988 | Pecoraro et al. | 501/70 |
| 4,866,010 | 9/1989 | Boulos et al. | 501/71 |

FOREIGN PATENT DOCUMENTS

| | | | |
|---|---|---|---|
| 618642 | 4/1961 | Canada | 501/71 |
| 1141417 | 12/1962 | Fed. Rep. of Germany | 501/71 |

*Primary Examiner*—Karl Group
*Attorney, Agent, or Firm*—Dennis G. Millman

[57] ABSTRACT

A clear glass, with the substantial absence of color in transmittance, and with an attractive, bright, pure azure edge coloration is achieved in a glass having greater than 87 percent, preferably greater than 90 percent, luminous transmittance by using very small amounts of iron oxide as the sole essential colorant, with the ratio of iron in the ferrous state to total iron being at least 0.4.

16 Claims, No Drawings

HIGHLY TRANSPARENT, EDGE COLORED GLASS

BACKGROUND OF THE INVENTION

This invention relates to glass compositions and products that are useful, for example, in furniture applications such as table tops or shelving. In such a setting, it is usually desired for the glass to be as free of color as possible so that the glass does not alter the appearance of the furniture, carpets, or other objects viewed through the glass. However, because of the elongated view path, a pronounced color usually shows at the edge of glass that is otherwise considered clear. In conventional clear glass, the edge color is green due to the presence of iron oxide in the glass. Iron oxide is deliberately added to most flat glass, but even when it is not, sufficient amounts to produce a green coloration are usually present as impurities from the raw materials from which the glass is melted. The green edge color may not be compatible with the decor of the room or with the other portions of the furniture of which the glass is a part.

Additionally, with a sheet of ordinary clear glass having typical dimensions of a shelf or a table top, the green color at the edge is very dark and does little to enhance the attractiveness of the piece. Including colorants in the glass can produce tinted glass of blue, gray, bronze, or other colors, but the accompanying reduction of transmittance has the effect of darkening the edge even more, in some cases rendering the edge essentially black. It would be desirable to have available glass that has a colorful but bright edge appearance.

It is known to produce glass that is almost colorless by selecting raw materials that have very little iron and by including cerium oxide in the glass to "decolorize" the remaining traces of iron. Cerium oxide is a powerful oxidizing agent in glass, and its function in decolorized glass is to oxidize the iron to the ferric state, which is a less powerful colorant and which shifts the transmittance spectrum of the glass toward yellow and away from the usual green-blue effect of iron in glass. The edge of this decolorized glass does not have the conventional green color, but it can have a slightly yellow appearance, and the presence of contaminants in the cerium oxide source material can sometimes produce a dull appearance at the edge. Even more objectionable for some intended uses is the fact that the presence of cerium oxide causes fluorescence of the edge portion of the glass under sunlight or certain artificial lighting conditions having a significant ultraviolet component. The fluorescence is exhibited as a vivid violet color at the edge. This is considered by some to be objectionable for color coordination purposes.

Other colorants can be added to glass to produce different colors that dominate over the green color of iron oxide. For example, cobalt oxide is known to produce blue color in glass. These colorants, however, generally reduce the transparency of the glass significantly, which is usually undesirable in a furniture application or the like.

It would be desirable to have available highly transparent glass with a pleasing edge appearance in colors other than green.

U.S. Pat. No. 4,792,536 (Pecoraro et al.) discloses a glass composition that has a blue tint due to a substantial amount of its iron oxide content being in the reduced ferrous state. It is not a high transparency glass, but has transparency to visible light of less than about 75 percent, usually about 70 percent, at standard thicknesses. The glass is also not colorless, having a measurable blue color in transmittance.

SUMMARY OF THE INVENTION

The present invention is a highly transparent glass with a pure, bright, azure edge color that presents a pleasing appearance and offers an alternative not previously available for furniture applications and the like. The effect is achieved by the use of very small amounts of iron oxide as the sole essential colorant. The use of cerium oxide or secondary colorants such as cobalt oxide is avoided, thereby yielding a purer color and maintaining very high transmittance of visible light. The visible light transmittance in the normal direction to a sheet 0.223 inches (5.66 millimeters) thick, expressed as luminous transmittance with illuminant C (C.I.E. international standard) is at least 87 percent, preferably greater than 90 percent, and typically greater than 90.5 percent. This compares to typical luminous transmittance of standard, clear flat glass of about 87 to 88 percent, and a theoretical maximum luminous transmittance for soda-lime-silica glass of 91.7 percent. Except for the edge coloration, the glass of the present invention can be considered to have a substantial absence of color. Although iron oxide is the colorant, its concentration in the glass is very low, with less than 0.02 percent by weight (expressed as $Fe_2O_3$), preferably less than 0.015 percent by weight present.

Providing reduction-oxidation (redox) conditions in glass which are relatively reducing is usually associated with darkly colored glasses such as amber glass. But the present invention utilizes relatively reducing conditions to achieve the desired azure coloration in a highly transparent glass. The redox ratio, measured as the ratio of iron in the ferrous state (expressed as FeO) to the total amount of iron (expressed as $Fe_2O_3$), is greater than 0.4 for the present invention. For comparison, in ordinary clear glass this ratio is usually about 0.25. Shifting more of the iron to the reduced state causes the color to shift away from green toward blue. Because there is so very little iron present, the color is produced with very little loss of luminous transmittance. The glass appears to be neutral in color when viewing through a sheet, but the edge exhibits the attractive azure color.

DETAILED DESCRIPTION

Providing the reducing conditions during melting that are required for this invention is difficult with a conventional overhead fired, tank-type melting furnace, so the type of glass melting and refining operation disclosed in U.S. Pat. No. 4,792,536 is preferred, although not essential. This and other types of melting arrangements that may be preferred are characterized by separate stages whereby more flexibility in controlling redox conditions is provided. The overall melting process of the preferred embodiment disclosed in that patent consists of three stages: a liquefaction stage, a dissolving stage, and a vacuum refining stage. Various arrangements could be employed to initiate the melting in the liquefaction stage, but a highly effective arrangement for isolating this stage of the process and carrying it out economically is that disclosed in U.S. Pat. No. 4,381,934 which is hereby incorporated by reference for details of the preferred liquefaction stage embodiment. The basic structure of the liquefaction vessel is a drum which may be fabricated of steel and has a generally cylindrical sidewall portion, a generally open top, and a bottom portion that is closed except for a drain outlet. The drum is mounted for rotation about a substantially vertical axis. A substantially enclosed cavity is formed within the drum by means of a lid structure.

Heat for liquefying the batch material may be provided by one or more burners extending through the lid. Preferably, a plurality of burners are arranged around the perimeter of the lid so as to direct their flames toward a wide area of the material within the drum. The burners are preferably water cooled to protect them from the harsh environment within the vessel.

Batch materials, preferably in a pulverulent state, may be fed into the cavity of the liquefying vessel by means of a chute. A layer of the batch material is retained on the interior walls of the drum aided by the rotation of the drum and serves as insulating lining. As batch material on the surface of the lining is exposed to the heat within the cavity, liquefied material flows down the sloped lining to a central drain opening at the bottom of the vessel. A stream of liquefied material falls freely from the liquefaction vessel through an opening leading to the second stage.

In order to provide reducing conditions for the purposes of the present invention the burner or burners in the liquefying stage may be operated with an excess amount of fuel relative to the amount of oxygen being supplied to each burner. For example, a ratio of 1.9 parts by volume oxygen to one part by volume natural gas has been found satisfactory for effecting the desired reduction levels in the glass. Alternatively, reducing conditions may be enhanced in the liquefaction stage by including a reducing agent such as coal in the batch mixture being fed to that stage, although this approach is usually not necessary for the present invention.

The second stage of the specific embodiment being described may be termed the dissolving vessel because one of its functions is to complete the dissolution of any unmelted grains of batch material remaining in the liquefied stream leaving the liquefaction vessel. The liquefied material at that point is typically only partially melted, including unmelted sand grains and a substantial gaseous phase. In a typical soda-lime-silica melting process using carbonate batch materials, the gaseous phase is chiefly comprised of carbon oxides. Nitrogen may also be present from entrapped air.

The dissolving vessel serves the function of completing the dissolution of unmelted particles in the liquefied material coming from the first stage by providing residence time at a location isolated from the downstream refining stage. Soda-lime-silica glass batch typically liquefies at a temperature of about 2200° F. (1200° C.) and enters the dissolving vessel at a temperature of about 2200° F. (1200° C.) to about 2400° F. (1320° C.), at which temperature residual unmelted particles usually become dissolved when provided with sufficient residence time. The dissolving vessel may be in the form of a horizontally elongated refractory basin with the inlet and outlet at opposite ends thereof so as to assure adequate residence time.

Although the addition of substantial thermal energy is not necessary to perform the dissolving step, heating can expedite the process and thus reduce the size of the dissolving vessel. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the preferred embodiment, the glass temperature need be raised to no more than 2700° F. (1480° C.), for example, and optionally no more than 2600° F. (1430° C.) prior to refining. When the lower range of pressures disclosed herein are used, the temperature in the refining vessel need be no higher than 2500° F. (1370° C.) in some cases. Peak temperature reductions on this order result in significantly longer life for refractory vessels as well as energy savings. The liquefied material entering the dissolving vessel need be heated only moderately to prepare the molten material for refining. Combustion heat sources may be used in the dissolving stage, but it has been found that this stage lends itself well to electric heating, whereby a plurality of electrodes may be provided. Heat is generated by the resistance of the melt itself to electric current passing between electrodes in the technique conventionally employed to electrically melt glass. The electrodes may be carbon or molybdenum of a type well known to those of skill in the art.

The refining stage preferably consists of a vertically upright vessel that may be generally cylindrical in configuration having an interior ceramic refractory lining shrouded in a gas-tight, water-cooled casing. The structure and process of the preferred vacuum refining stage are those described in U.S. Pat. No. 4,738,938 (Kunkle et al.). A valve fitted to an inlet tube may be used to control the rate at which the molten material enters the vacuum refining vessel. As the molten material passes through the tube and encounters the reduced pressure within the refining vessel, gases included in the melt expand in volume, creating a foam. As foam collapses it is incorporated into the liquid body held in the refining vessel. Distributing the molten material as thin membranes of a foam greatly increases the surface area exposed to the reduced pressure. Therefore, maximizing the foaming effect is preferred. It is also preferred that the foam be exposed to the lowest pressures in the system, which are encountered at the top of the vessel in the headspace above the liquid, and therefore exposure is improved by permitting newly introduced, foamed material to fall through the head space onto the top of the foam layer. Refined molten material may be drained from the bottom of the refining vessel by way of a drain tube of a refractory metal such as platinum. The benefits of vacuum on the refining process are attained by degrees; the lower the pressure, the greater the benefit. Small reductions in pressure below atmospheric may yield measurable improvements, but to economically justify the vacuum chamber, the use of substantially reduced pressures are preferred. Thus, a pressure of no more than one-half atmosphere is preferred for the appreciable refining improvements imparted to soda-lime-silica flat glass. Significantly greater removal of gases is achieved at pressures of one-third atmosphere or less. More specifically, a refining pressure below 100 torr, for example 20 to 50 torr, is preferred to yield commercial float glass quality of about one seed per 1,000-10,000 cubic centimeters. Seeds less than 0.01 millimeter in diameter are considered imperceptible and are not included in the seed counts.

Typically, flat glass batch includes sodium sulfate as a melting and refining aid in the amounts of about 5 to 15 parts by weight per 1000 parts by weight of the silica source material (sand), with about 10 parts by weight considered desirable to assure adequate refining. When operating in accordance with the preferred embodiment, however, it has been found preferable to restrict the sodium sulfate to two parts by weight, and yet it has been found that refining is not detrimentally affected. Most preferably, the sodium sulfate is utilized at no more than one part per 1000 parts sand, with one-half part being a particularly advantageous example. These weight ratios have been given for sodium sulfate, but it should be apparent that they can be converted to other sulfur sources by molecular weight ratios. Complete elimination of refining aids is feasible with the present invention, although trace amounts of sulfur are typically present in other batch materials and colorants so that small amounts of sulfur may be present even if no deliberate inclusion of sulfur is made in the batch. Moreover, the vacuum treatment has been found to reduce the concentration of volatile gaseous components, particularly the refining aids such as sulfur, to levels lower than the equilibrium levels attained with conventional processes. Soda-lime-silica glass products, particularly flat glass products, that are mass-produced by conventional continuous melting processes are characterized by significant amounts of residual refining aids. In such products, the residual sulfur content (expressed as $SO_3$) is typically on the order of 0.2% by weight and seldom less than 0.1%. Even when no deliberate addition of sulfur refining aid is made to the batch, at least 0.02% $SO_3$ is usually detected in a soda-lime-silica glass made in a conventional continuous melter. In distinction thereto, soda-lime-silica glass in accordance with the present invention can be produced continuously by the preferred embodiment disclosed herein with less than 0.02% residual $SO_3$, even when relatively small amounts of sulfur refining aid are being included in the batch as described above, and less than 0.01% $SO_3$ when no deliberate inclusion of sulfur is being made. At the lowest pressures, with no deliberate sulfur addition, $SO_3$ contents less than 0.005% are attainable. Although low levels of $SO_3$ are not essential for the present invention, low concentration of $SO_3$ are an advantage under the most reduced redox conditions for the sake of avoiding formation of substantial amounts of ferric sulfide complex, which contributes an amber coloration to the glass. Traces of amber coloration may be tolerable in some examples of the present invention, but in general it is undesirable because it detracts from the purity of the desired azure color and reduces luminous transmittance.

In the preferred arrangement for producing the glass of the present invention, a stirring arrangement may be employed to homogenize the glass after it has been refined in order to produce glass of the highest optical quality. A particular embodiment may include a stirring chamber below the refining vessel within which a stream of glass is received from the refining vessel. The glass is preferably above 2200° F. (1200° C.) during stirring. For purposes of the present invention the stirring arrangement is not limited to any particular structure of stirrer, any of the various mechanical devices that have been proposed for stirring molten glass in the prior art being usable. Some arrangements may be more effective than others in homogenizing the glass, but the number of stirrers and their speed of rotation can be selected to compensate for variations in efficiency. A particular example of a suitable stirrer structure is that disclosed in U.S. Pat. No. 4,493,557 (Nayak et al.). An optional feature, preferred for making higher quality flat glass, is that the stirring chamber may be integrated with a float forming chamber, whereby the glass in the stirring chamber rests on a layer of molten metal. The molten metal may be continuous with the molten metal constituting the support in the forming chamber, and is usually comprised essentially of tin. It has been found that the contact with molten metal in the stirring chamber tends to have a reducing effect on the glass, which is advantageous for attaining the redox conditions of the present invention. The reducing effect of stirring the glass while in contact with molten metal can be sufficient to eliminate the need to provide any particular redox conditions in the combustion sources in upstream stages of the process as described above.

The base glass of the present invention, that is, the major constituents of the glass without colorants, is commercial soda-lime-silica glass characterized as follows:

|  | Weight % |
|---|---|
| $SiO_2$ | 66–75 |
| $Na_2O$ | 12–20 |
| CaO | 7–12 |
| MgO | 0–5 |
| $Al_2O_3$ | 0–4 |
| $K_2O$ | 0–3 |

In addition to colorants and the $SO_3$ discussed above, other melting and refining aids may be present. Arsenic, antimony, fluorine, chlorine and lithium compounds are sometimes used, and small amounts may be detected in this type of glass.

Although not limited thereto, the glass of the present invention will most commonly be embodied by a flat sheet suitable for table tops, shelving or other furniture components. Usually the sheet form will be made by the float process. A sheet of glass that has been formed by the float process (i.e., floated on molten tin) is characterized by measurable amounts of tin oxide that have migrated into surface portions of the glass on at least one side. Typically a piece of float glass has an $SnO_2$ concentration of at least 0.05% by weight in the first few microns below the surface that was in contact with the tin.

The total amount of iron present in the glass is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$). The redox ratio for the glass of the present invention is maintained above 0.4. This is achieved by means of controlling process conditions as described above. It is the ferrous state of the iron that yields the characteristic azure edge coloration of the glass of the present invention. For the products of the present invention there is theoretically no maximum value for the redox ratio, but in actual practice redox ratios above about 0.65 can result in unduly large amounts of amber coloration due to ferric sulfide formation if sulfur is present in the glass.

For the purposes of the present invention, the total iron concentration of the glass is maintained below 0.02 percent by weight, preferably less than 0.015 percent. The only iron present is that which is introduced as impurity in some of the batch materials. Batch materials are selected for minimal iron contamination, but it would be difficult to reduce the total iron content of the glass below about 0.005 percent by weight without incurring considerable expense. Furthermore, some trace of iron is useful to provide the azure edge coloration sought in the present invention. Most of the preferred examples of the present invention contained from 0.008 to 0.012 percent by weight total $Fe_2O_3$. In particular, batch selection includes a low iron sand which, for example, may have an iron content of about 0.005 percent by weight iron analyzed as $Fe_2O_3$. Limestone and dolomite, conventional glass batch materials, are avoided because of their typical iron contamination. Instead, it is preferred to use a purer source of calcium such as aragonite, which is a mineral form of calcium carbonate with only about 0.01 percent by weight $Fe_2O_3$. A preferred alumina source is aluminum hydrate, with about 0.008 percent by weight $Fe_2O_3$. An example of a batch mixture that can be employed to produce glass of the present invention is as follows:

| Batch Constituent | Parts by Weight |
| --- | --- |
| Sand | 1000 |
| Soda ash | 346.0 |
| Aragonite | 263.0 |
| Aluminum hydrate | 35.1 |

The batch formulation set forth above, when melted in accordance with the process described herein, yielded the following glass composition:

| | Weight % |
| --- | --- |
| $SiO_2$ | 73.07 |
| $Na_2O$ | 14.63 |
| CaO | 10.11 |
| MgO | 0.08 |
| $Al_2O_3$ | 1.80 |
| $K_2O$ | 0.01 |
| $Fe_2O_3$ | 0.010 |
| SrO | 0.21 |
| $SO_3$ | 0.015 |
| $ZrO_2$ | 0.028 |
| $FeO/Fe_2O_3 = 0.60$ | |

This example of a glass in accordance with the present invention had a pleasing bright, light azure edge color and exhibited the following properties in transmittance at a standard thickness of 0.223 inches (5.66 millimeters):

| LT$_C$ | 90.8% |
| --- | --- |
| Dominant wavelength | 490.50 nanometers |
| Excitation purity | 0.27% |
| TSUV | 88.4% |
| TSIR | 86.4% |
| TSET | 88.5% |

The radiation transmittance data herein are based on the following wavelength ranges:

| Ultraviolet (TSUV) | 300-390 nanometers |
| --- | --- |
| Visible (LT$_C$) | 400-770 nanometers |
| Infrared (TSIR) | 800-2100 nanometers |

Luminous transmittance (LT$_C$) is measured using C.I.E. standard illuminant C. Total solar energy transmittance (TSET) is a weighted cumulative measure of the combined values of luminous transmittance, TSIR (total solar infrared transmittance), and TSUV (total solar ultraviolet transmittance).

The desired azure coloration of the glasses of the present invention may vary somewhat in accordance with personal preference. When the glass is made in accordance with the preferred teaching set forth herein, it has been found to have color in transmittance characterized by dominant wavelength in the range 487 to 495 nanometers. The most pleasing examples are considered to be those whose dominant wavelengths are in the range 489 to 493 nanometers. The goal of providing nearly neutral color when viewing normal to the surface of the glass sheet is attained by a near absence of color in the glass of the present invention. The near absence of light absorbing colorants also provides an attractive, bright color at the edge of the glass. The edge color is a pure color, that is, it is not a composite color produced from the combination of absorption characteristics of several colorants. The single transmittance peak of iron in the ferrous state is by far the strongest contributor to the color of the glass, and the dominant wavelength of the glass is at or very close to this peak. In a glass having such high transmittance, a significant contribution to the color of the glass can result from the presence of trace amounts of substances such as chrome oxide (which may be present from contamination in amounts of about 2 to 3 parts per million), iron in the ferric state, or polysulfides that may form under reducing conditions from the traces of sulfur normally present in glass. Although traces of these and other impurities may be present in the glass of the present invention, they have no significant contribution to the color of the glass due to the dominant effect of the iron in the ferrous state, and the color has a pure appearance. A pure color would normally be associated with a relatively high exitation purity, but due to the substantial absence of color in the glass of the present invention, it exhibits excitation purity values well below 1.0 percent, preferably below 0.4 percent. The preferred examples of the present invention have excitation purity values in the range of 0.2 to 0.3 percent.

Other variations and modifications as would be known to those of skill in the art may be resorted to without departing from the scope of the invention defined by the claims that follow.

I claim:

1. Clear glass with pure edge coloration comprising a soda-lime-silica base glass portion comprising:

| | Weight % |
| --- | --- |
| $SiO_2$ | 66-75 |
| $Na_2O$ | 12-20 |
| CaO | 7-12 |
| MgO | 0-5 |
| $Al_2O_3$ | 0-4 |
| $K_2O$ | 0-3 | and a colorant portion consisting essentially of iron oxide in an amount less than 0.02 percent by weight of the glass expressed as $Fe_2O_3$, the ratio of iron present in the glass in the ferrous state expressed as FeO to the total amount of iron in the glass expressed as $Fe_2O_3$ being at least 0.4, whereby the glass exhibits luminous transmittance (illuminant C) of at least 87 percent at a thickness of 0.223 inches (5.66 millimeters), the colorant portion including all essential colorants in the glass.

2. The glass of claim 1 wherein the colorant consists essentially of iron oxide in an amount less than 0.015 percent by weight of the glass expressed as $Fe_2O_3$.

3. The glass of claim 1 wherein the glass exhibits a luminous transmittance of at least 90 percent.

4. The glass of claim 1 wherein the glass exhibits a luminous transmittance of at least 90.5 percent.

5. The glass of claim 1 wherein the glass exhibits a dominant wavelength in transmission of 487 to 495 nanometers.

6. The glass of claim 1 wherein the glass exhibits a dominant wavelength in transmission of 489 to 493 nanometers.

7. The glass of claim 1 wherein the excitation purity in transmission is less than 1.0 percent.

8. The glass of claim 1 wherein the excitation purity is less than 0.4 percent.

9. The glass of claim 1 wherein the glass includes less than 0.05 percent by weight $SO_3$.

10. A method of making clear glass having pure edge coloration comprising: feeding batch materials to a melting stage of a glassmaking operation, the batch materials being selected to provide in the final glass product having the following base glass composition:

|  | Weight % |
| --- | --- |
| $SiO_2$ | 66–75 |
| $Na_2O$ | 12–20 |
| CaO | 7–12 |
| MgO | 0–5 |
| $Al_2O_3$ | 0–4 |
| $K_2O$ | 0–3 | and a total iron oxide content of no more than 0.02 percent by weight expressed as $Fe_2O_3$; providing to the glassmaking operation no significant colorant other than iron; controlling redox conditions in the glassmaking operation to maintain the ratio of iron present in the glass in the ferrous state expressed as FeO to the total amount of iron in the glass expressed as $Fe_2O_3$ equal to or greater than 0.4; and forming the glass into a clear glass product, whereby the glass has luminous transmittance (illuminant C) of at least 87 percent at a thickness of 0.223 inches (5.66 millimeters).

11. The method of claim 10 wherein the melting operation includes separate liquefying and refining stages.

12. The method of claim 10 wherein the batch materials are essentially free of limestone and dolomite.

13. The method of claim 10 wherein the step of forming the glass into a glass product comprises forming the glass into a flat sheet.

14. The method of claim 13 wherein the forming of the glass into a flat sheet includes floating the glass on molten metal.

15. The method of claim 14 wherein controlling the redox conditions includes stirring the glass while supported on molten metal.

16. The method of claim 10 wherein controlling the redox conditions includes operating combustion means in the melting stage under reducing conditions.

* * * * *